United States Patent
Ferrigan

[19]

[11] Patent Number: 6,019,235
[45] Date of Patent: Feb. 1, 2000

[54] COLLAPSIBLE RACK FOR AUTOMOTIVE BODY PANEL

[76] Inventor: Paul J. Ferrigan, 113 Timber La., Saratoga, N.Y. 12866

[21] Appl. No.: 08/135,883

[22] Filed: Oct. 13, 1993

[51] Int. Cl.[7] .................................................. F16M 11/38
[52] U.S. Cl. ........................ 211/195; 248/129; 248/166; 280/645
[58] Field of Search ............................... 211/182, 13, 41, 211/49.1, 195; 248/129, 166; 280/47.34, 79.3, 79.7, 79.11, 38, 641, 642, 645, 39, 40

[56] References Cited

U.S. PATENT DOCUMENTS

| | | | |
|---|---|---|---|
| 3,132,875 | 5/1964 | Plumly | 280/79.11 X |
| 3,230,908 | 1/1966 | Grant | 248/418 X |
| 4,153,264 | 5/1979 | Pfister | 280/38 |
| 4,326,726 | 4/1982 | Dunchock | 211/182 X |
| 4,867,467 | 9/1989 | Dunchock | 280/79.3 |
| 5,221,066 | 6/1993 | Ferrigan et al. | 280/79.7 X |

*Primary Examiner*—Alvin Chin-Shue
*Attorney, Agent, or Firm*—McCormick, Paulding & Huber

[57] ABSTRACT

A vertical frame has a lower horizontal bar with opposed ends that pivotably receive the rear portions of two L-shaped members. Forward portions of these L-shaped members have abutments to receive one edge of a roof panel to be supported thereon with another part of the panel resting against the top of the vertical frame. Casters on these L-shaped members allow the rack and its load to be transported. Two of these casters have support posts that are received in slots to limit pivotal motion of the L-shaped members relative to the vertical frame.

6 Claims, 2 Drawing Sheets

COLLAPSIBLE RACK FOR AUTOMOTIVE BODY PANEL

BACKGROUND OF THE INVENTION

This invention relates generally to racks for supporting an automotive body panel such as a hardtop roof, and deals more particularly with a collapsible rack for use by the owner of the vehicle in order to store the relatively bulky hardtop of his automobile.

SUMMARY OF THE INVENTION

In accordance with the present invention a collapsible rack is erected for supporting an automotive body panel such as a hardtop roof. The rack includes a generally vertically oriented frame pivotably supporting two L-shaped members. Two vertically oriented columns and a lower horizontal bar comprise the vertical frame, and the bar pivotably receives a rear leg or portion of each L-shaped member such that a front portion of each L-shaped member is adapted to extend forwardly from the vertical frame when the rack is in its extended position. The forward end of each forward portion includes a stop or abutment for receiving one edge of a roof or body panel to be supported.

In the stowed position both L-shaped members are raised or pivoted vertically upwardly to assume positions wherein the forward portions or legs of the L-shaped members are vertically oriented.

The forward end of each leg has a roller adjacent the forward end thereof. The rear leg of each L-shaped member has additional rollers so that these rollers cooperate to define a relatively large generally trapezoidally shaped footprint for the rack when the rack is in its erected position.

DETAILED DESCRIPTION

Figure 1:
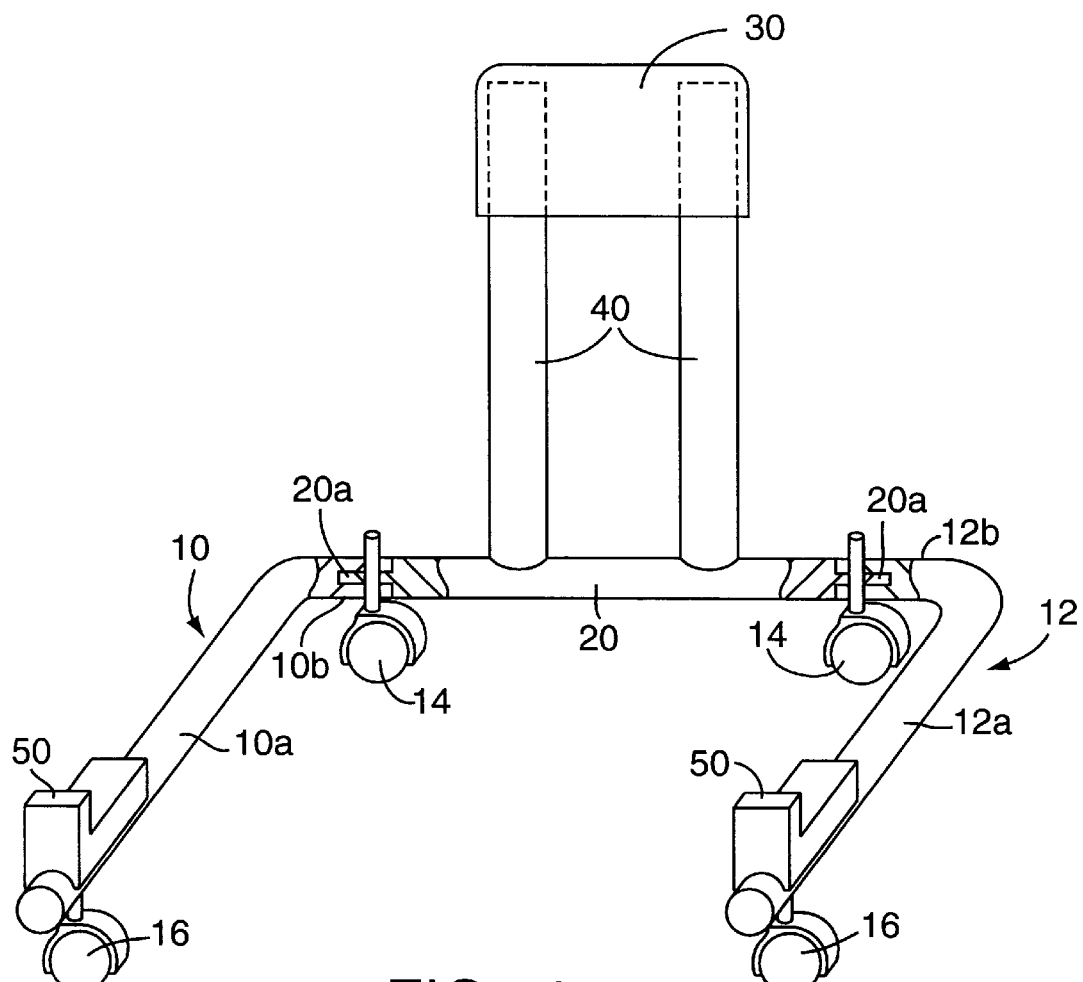
FIG. 1 is a top front perspective view of the collapsible rack in its erected position.

Turning now to the drawings in greater detail, FIG. 1 illustrates a rack constructed in accordance with the present invention, which rack comprises oppositely disposed L-shaped members 10 and 12 which in the erected position shown are oriented in a horizontal plane and supported by rollers as indicated generally at 14 and 16. The subject rack also comprises a vertical frame composed of parallel columns 40, 40 welded to a horizontal bar 20. A soft pad 30 is provided at the top of the columns 40, 40.

Each L-shaped member has a front portion or leg, 10a for the L-shape member 10, and 12a for the L-shape member 12, as well as rear portions 10b and 12b respectively. The front leg portions have abutments 50, 50 adjacent the front ends of these leg portions. The horizontally extending cross bar 20 has opposed end portions 20a, 20a received in the open ends of the rear leg portions 10b and 12b of these L-shaped members 10 and 12. The tubular cross section provides a convenient means for pivoting these L-shaped members around the ends 20a, 20a from horizontal positions of (FIG. 1) to vertical position of (FIG. 3).

As mentioned previously the front rollers or wheels 16, 16 are provided at the forward end of the L-shaped members 10 and 12 whereas the rear wheels 14, 14 are provided adjacent the inner ends of the rear portions 10b and 12b of these L-shaped members 10 and 12 respectively. Each roller or wheel comprises a caster having an upstanding post for mounting the wheel to the tubular members 10 and 12. The rear wheels 14, 14 have their upstanding posts or shafts received in arcuate slots provided for this purpose in the projecting end portions 20a, 20a of the horizontal member 20.

Figure 3:
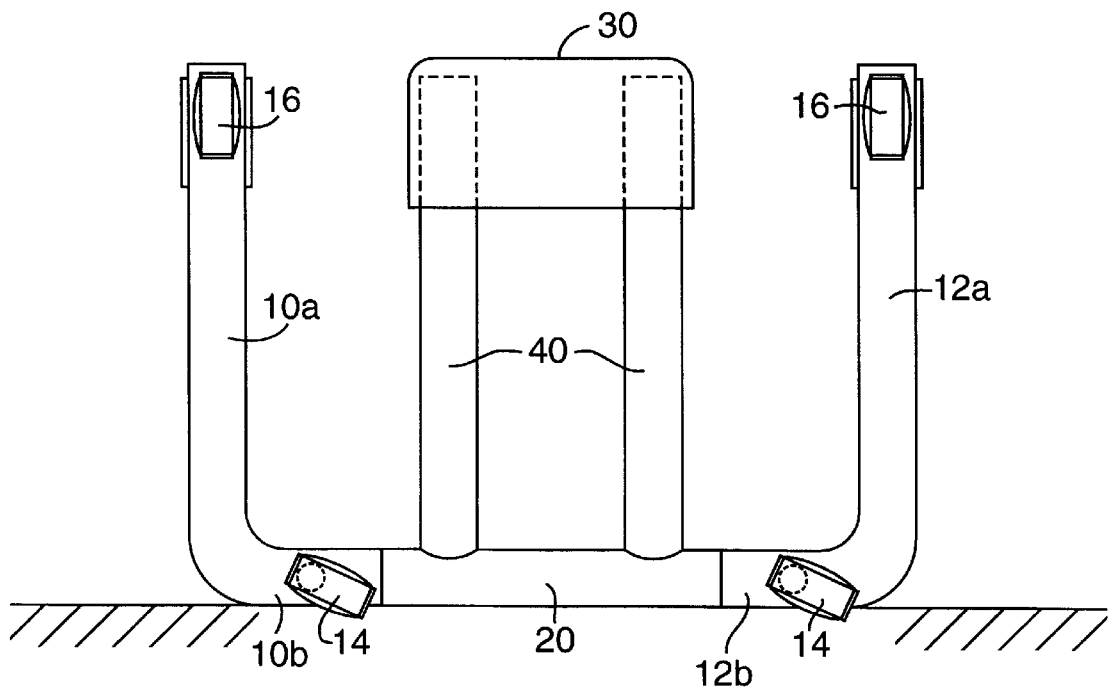
FIG. 3 is a perspective view of the rack in its stowed position.

As so constructed and arranged the L-shaped members 10 and 12 can be moved from the horizontal positions shown in FIG. 1 to the vertical positions of FIG. 3 providing a rack stowed condition that is compact and easily assumed with a minimum of effort by the user of the subject rack. The arcuate slots provided in the end portions 20a, 20a of the horizontal member 20 have slotted end portions that serve to define stops for the caster support posts, and hence for the L-shaped members. A hardtop roof panel can be placed against the abutments 50, 50 provided for this purpose on the front end of the L-shaped members, and the hardtop roof panel is laid against the pad 30 provided for this purpose at the upper ends of the two vertically oriented columns 40, 40. These columns have their lower ends welded to horizontally spaced locations on the horizontal member 20 and their upper ends are adapted to receive the pad 30 for so supporting a hardtop roof panel or other body panel.

Figure 2:
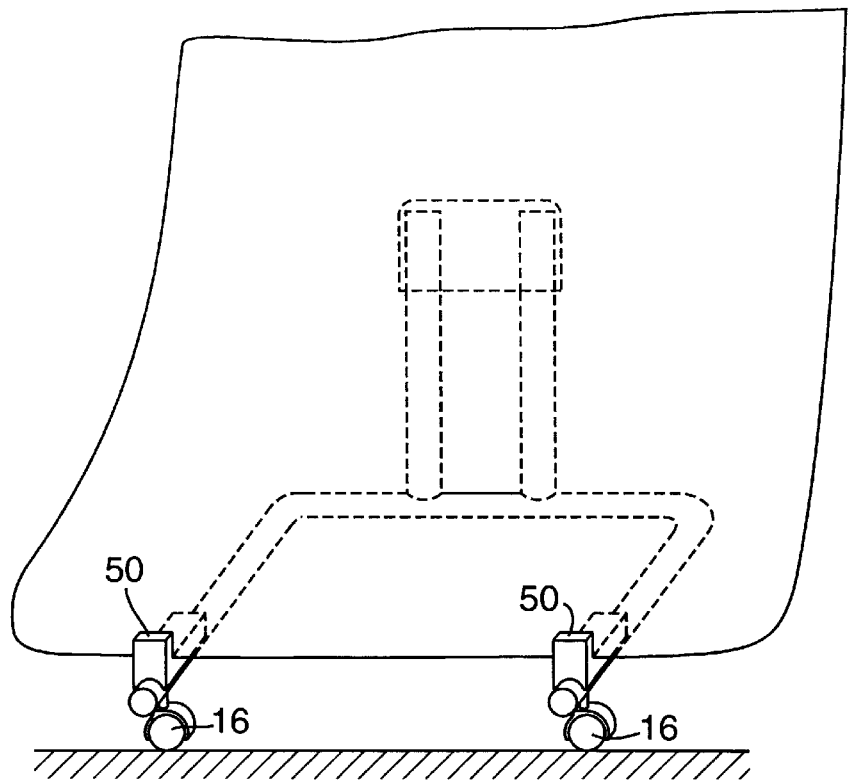
FIG. 2 is a view of the rack of FIG. 1 with a hardtop provided thereon.

FIG. 2 illustrates a hardtop roof panel supported on a the erected rack as described above. FIG. 3 illustrates the rack with the legs folded vertically upwardly so as to be generally oriented parallel to the vertical columns 40, 40. It will be apparent that as so folded upwardly the entire rack is well suited for storage and occupies a minimum of floor space. Because the rear rollers 14, 14 rotate with the L-shaped members it will also be apparent that the folded rack can be conveniently stored without requiring that any of the rollers touch the ground in this stowed configuration.

What is claimed is:

1. A rack for storing removable automobile hardtops and the like comprising a vertical frame, and a pair of L-shaped members, each L-shaped member having integrally connected forward and rear portions, each said rear portion of said L-shaped member having an end pivotably mounted to a lower end of said vertical frame for independent arcuate movement of said forward portions of said L-shaped members on a common axis and in substantially vertical and parallel planes from horizontal to vertical positions.

2. The rack of claim 1 further comprising wheel means provided on said L-shaped members for supporting said rack to facilitate transport of the rack when said forward portions of said L-shaped members are oriented horizontally.

3. The rack of claim 2 wherein said wheel means comprises individual casters, two of said casters mounted to said forward portions of said L-shaped members, and two other casters mounted to said rear portions of said L-shaped members.

4. The rack of claim 1 further wherein pin and slot means restricts movement of said L-shaped members to 90 degrees of motion relative to said vertical frame.

5. The rack according to claim 2 wherein said wheel means comprise front casters supported at front ends of said forward portions of said L-shaped members remote from said vertical frame, and wherein said wheel means further includes rear casters supported at the rear ends of said L-shaped members to provide a stable support for the rack when said L-shaped legs are oriented horizontally.

6. The combination according to claim 5 wherein said vertical frame comprises a horizontal bar and at least one vertical column oriented at right angles to said horizontal bar, and wherein said horizontal bar has opposed end portions for rotatably receiving said ends of said rear portions of said L-shaped members, said horizontal bar defining said common axis and of motion for said L-shaped members.

* * * * *